Dec. 26, 1961  A. J. PIEL  3,014,457
LIQUID APPLICATOR FOR ANIMAL USAGE
Filed March 7, 1960
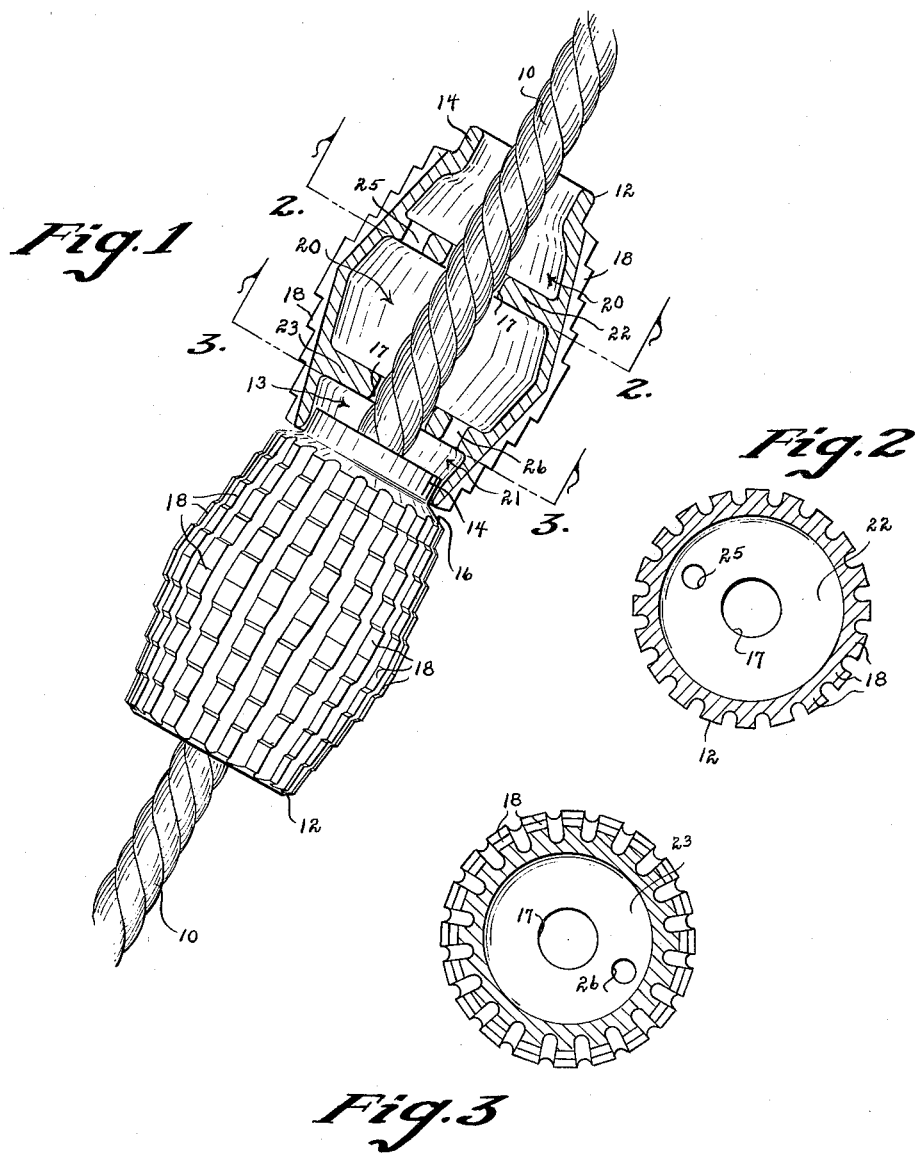
INVENTOR
ALFRED J. PIEL
BY
M. Talbert Dick
ATTORNEY
WITNESS
NORMAN G. TRAVISS 3,014,457
LIQUID APPLICATOR FOR ANIMAL USAGE
Alfred J. Piel, Hubbard, Iowa
Filed Mar. 7, 1960, Ser. No. 13,343
8 Claims. (Cl. 119—157)

This invention relates to devices used in animal husbandry and more particularly to an animal oiler used in conjunction with other equipment. It is a continuation in part of my application Serial No. 734,636 on a Liquid Applicator for Animal Usage, filed May 12, 1958, now abandoned.

Especially in the raising of cattle, the outside of the animal is often treated to make the hair oily and brilliant. If an oil is used, the skin of the animal is also treated and greatly benefited. Often the solutions used prevent skin diseases, and eliminate parasites such as ticks, flies, and like. Some effort has been made to provide rubbing cables saturated with the liquid treatment wherein the animal will rub or scratch itself on the cable and thereby distribute the liquid treatment over its body. One of the chief problems with such equipment is the continuous saturating of the cable so that when the animal uses the rubbing cable, it will rub off on its hide sufficient liquid to obtain the desired results. My United States Patent No. 2,794,422, issued on June 4, 1957, for a Liquid Applicator for Animal Usage solved the continuous supply phase. However, two additional problems developed. First, little if any liquid arrived at the lower end portion of the cable and, secondly, the round washers around the cable did not dig into the animal hair to reach the surface skin of the animal, nor did they effectively scratch the animal to dislodge parasites. Also, the liquid supply was from only one direct source.

Therefore, one of the principal objects of my invention is to provide rotatable liquid applicators for use on cables that conserve and direct the liquid from one end area of the cable to the other end area of the cable.

A further object of this invention is to provide liquid applicators for cables that have surplus oil receiving pockets acting as auxiliary liquid supply means throughout the length of the cable upon which they operate.

A further object of my invention is to provide animal liquid applicators that once installed require little if any attention from the stockman.

Still further objects of this invention are to provide a ridged spool liquid applicator and auxiliary liquid supply pockets for cables that is economical in manufacture, durable in use, and refined in appearance.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

FIG. 1 is a side view of my reservoir liquid applicators on a cable and with sections cut away to more fully illustrate their constructions;

FIG. 2 is a cross sectional view of one of my applicators taken on line 2—2 of FIG. 1 with the cable omitted; and FIG. 3 is a cross sectional view taken on line 3—3 of FIG. 1 with the cable omitted.

In these drawings I have used the numeral 10 to designate an oil applicator cable. As is well known such cables extend downwardly and outwardly, are fastened at top and bottom and are supplied with a liquid such as lotions, medicated chemicals, oils and like, at their upper ends, such as disclosed in my herebefore mentioned issued patent. This liquid runs down the cable and seeps outwardly on the elements on the cable. To redirect the liquid back to the cable proper and to retain an auxiliarly supply so that a supply will be available substantially throughout the length of the cable I have provided a plurality of hollow spool applicators for spaced use on the cable and which I will now describe in detail.

I have used the numeral 12 to generally designate my spool units. The numeral 13 designates an enlarged well area in the lower receiving end portion of each of the spools 12. The rim edge 14 is reduced on the upper end of the spool and extends upwardly and inwardly. Inasmuch as the units 12 are adapted to partially nest with each other, the upper end 14 of one unit is adapted to extend into the well 13 in the lower end of the spool 12 directly adjacent and above it. Therefore, the outside diameter of the portion 14 is slightly less than that of the inside diameter of the well 13. The numeral 16 designates a downwardly and outwardly extending shoulder just below the end portion 14. This shoulder 16 is adapted to complement the flared edge 13 of the spool directly above it. The numeral 17 designates a bore extending longitudinally through each of the spools. This bore 17 has an inside diameter slightly greater than that of the outside diameter of the cable 10. In use a plurality of my partially nesting spool units are rotatably mounted on the cable as shown in FIG. 1. Longitudinal notched ridges 18 are formed on the outer surface of each spool and each spool is of greater diameter at its center length than it is at its two end areas.

Inside each spool and embracing and communicating with its bore, are pluralities of spaced apart ring depressions 20. Each ring groove depression therefore has a bottom and two sides with its top opening encircling, communicating with, and common with the bore. In the drawings I show two ring grooves in each unit. The length of the end 14 is substantially less than that of the depth of the well 13, therefore creating a third continuous ring groove 21 around the bore and cable. These ring groove depressions provide circular receptacles or trap pockets around and communicating with the cable 10.

Because of the internal depressions 20 and 21, two inwardly extending walls 22 and 23 are created as shown in FIG. 1. Through the wall 22 and near its outer area is a liquid passageway 25. A like liquid passageway 26 extends through the wall 23. However, these two passageways 25 and 26 are diametrically positioned relative to each other as shown in the drawings.

With an initial supply of liquid furnished onto the upper end of the cable 10, the liquid will run downwardly by force of gravity. The liquid will pass from the inside of a spool to the outer side of the next lower unit. From the outside of a unit 12, the liquid will flow downwardly and inwardly to the shoulder 16 of the next lower unit. Much of the liquid however, will pass downwardly by intermittently passing from the ring depression traps 20 and 21 to the cable and then from the cable back into the ring depression traps 20 and 21 of the next lower unit. As the liquid thus moves downwardly some of it will pass from the lower ring area 21 of each unit onto shoulder 16 below it and thence onto the outer side of such next lower unit. Obviously, the liquid traps in a unit are due to the walls 22 and 23, each of which act as a partial dam. However, these walls 22 and 23 would not be efficient for the purpose intended if the passageways 25 and 26 were in alignment with each other. An animal rubbing against the units 12 will individually rotate them, and this means the change of position of a passageway 25 to a passageway 26. By this construction, the walls 22 and 23, will only intermittently act as dams to trap liquid. If a passageway is in a lowered position, it will permit the liquid in the trap area above it to pass to a lower level, but when this position is realized the passageway in the other wall dam will be in elevated position and this wall will be acting as a dam to the liquid in the trapped area above it. Therefore, some liquid will be passed downwardly from a unit, but some will be retained for future usage when the unit is rotated to another position. Thus the downward movement of the liquid will be partially retarded, but at the same time, some of it will be furnished to the outer sides of all the units 12 on the cable.

With a cable filled with my units, not only will the units all be serviced with liquid from the top of the cable to the bottom of the cable, but an auxiliary supply of liquid will be maintained in each of the units. This auxiliary supply will be used by seepage caused by capillary action and by the rotation of the units by being contacted by the animals.

Some changes may be made in the construction and arrangement of my liquid applicator for animal usage without departing from the real spirit and purpose of my invention, and it is my intention to cover by my claims, any modified forms of structure or use of mechanical equivalents which may be reasonably included within their scope.

I claim:

1. A cable extending at an angle to the vertical and adapted to be in communication with a source of liquid at its upper portion, a plurality of spool units each having a bore rotatably embracing said cable and having a liquid trap pocket communicating with its bore, a well longitudinally recessed into the lower end of each of said spool units, and a reduced upper end on each of said spool units extending into the well longitudinally recessed into the lower end of the spool unit directly above it.

2. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, and a second aperture also defined as a liquid passageway extending through the other said wall near its outer area; said two liquid passageways being in biased relation to each other.

3. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, and a second aperture also defined as a liquid passageway extending through the other said wall near its outer area; said two liquid passageways being positioned diametrically opposite to each other.

4. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, a second aperture defined as a liquid passageway extending through the other said wall near its outer area; said two liquid passageways being positioned diametrically opposite to each other, a receiving cavity longitudinally recessed into the lower end of said housing, and a reduced portion on the upper end of said housing.

5. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, a second aperture also defined as a liquid passageway extending through the other said wall near its outer area; said two liquid passageways being positioned diametrically opposite to each other, a receiving cavity longitudinally recessed into the lower end of said housing, a reduced portion on the upper end of said housing, and a downwardly and outwardly extending shoulder at the base of said reduced end portion.

6. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, a second aperture also defined as a liquid passageway extending through the other said wall near its outer area; said two liquid passageways being positioned diametrically opposite to each other, a receiving cavity longitudinally recessed into the lower end of said housing, a reduced portion on the upper end of said housing, a downwardly and outwardly extending shoulder at the base of said reduced end portion, and spaced ridges on the outer side of said housing.

7. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, a second aperture also defined as a liquid passageway extending through the other said wall near its outer area; said two liquid passageways being positioned diametrically opposite to each other, a receiving cavity longitudinally recessed into the lower end of said housing, a reduced portion on the upper end of said housing, a downwardly and outwardly extending shoulder at the base of said reduced end portion, and longitudinal spaced ridges on the outer side of said housing.

8. In a liquid applicator member, a hollow tubular housing, two spaced apart transverse walls in said housing each having a central hole adapted to rotatably embrace a downwardly and outwardly extending cable, an aperture defined as a liquid passageway extending through one of said walls near its outer area, a second aperture also defined as a liquid passageway extending through the other said wall near its outer area; said two liquid passageways being positioned diametrically opposite to each other, a receiving cavity longitudinally recessed into the lower end of said housing, a reduced portion on the upper end of said housing, a downwardly and outwardly extending shoulder at the base of said reduced end portion, and longitudinal spaced ridges on the outer side of said housing; said housing having a central length diameter greater than that of the diameter of its two end portions.

References Cited in the file of this patent

UNITED STATES PATENTS 2,794,422    Piel _____ June 4, 1957